United States Patent
Martin et al.

(10) Patent No.: US 9,996,149 B1
(45) Date of Patent: Jun. 12, 2018

(54) METHOD FOR ONE-TOUCH TRANSLATIONAL NAVIGATION OF IMMERSIVE, VIRTUAL REALITY ENVIRONMENTS

(71) Applicant: ImmersaCAD Corporation, Knoxville, TN (US)

(72) Inventors: Harry Lee Martin, Knoxville, TN (US); Kyle Leinart, Briceville, TN (US)

(*) Notice: Subject to any disclaimer, the term of this patent is extended or adjusted under 35 U.S.C. 154(b) by 97 days.

(21) Appl. No.: 15/049,783

(22) Filed: Feb. 22, 2016

(51) Int. Cl.
| | |
|---|---|
| G09G 5/00 | (2006.01) |
| G06F 3/01 | (2006.01) |
| G02B 27/01 | (2006.01) |
| G06F 3/0354 | (2013.01) |
| G06F 3/0338 | (2013.01) |
| G06F 3/16 | (2006.01) |
| G06T 19/00 | (2011.01) |

(52) U.S. Cl.
CPC .......... G06F 3/012 (2013.01); G02B 27/017 (2013.01); G06F 3/0338 (2013.01); G06F 3/03547 (2013.01); G06F 3/167 (2013.01); G06T 19/003 (2013.01); G06T 19/006 (2013.01)

(58) Field of Classification Search
CPC ...... G06F 3/012; G06F 3/03547; G06F 3/167; G06F 3/0338; G02B 27/017; G02B 2027/0198; G02B 27/01; G06T 19/003; G06T 19/006
See application file for complete search history.

(56) References Cited

U.S. PATENT DOCUMENTS

| | | | |
|---|---|---|---|
| 5,562,572 | A | 10/1996 | Carmein |
| 5,580,249 | A | 12/1996 | Jacobsen et al. |
| 5,590,062 | A | 12/1996 | Nagamitsu et al. |
| 5,782,639 | A | 7/1998 | Beal |
| 5,831,584 | A | 11/1998 | Socks et al. |
| 5,864,333 | A | 1/1999 | O'Heir |
| 5,902,214 | A | 5/1999 | Makikawa et al. |
| 6,084,556 | A | 7/2000 | Zwern |
| 6,127,990 | A | 10/2000 | Zwern |
| 6,135,928 | A | 10/2000 | Butterfield |
| 6,359,603 | B1 | 3/2002 | Zwern |

(Continued)

FOREIGN PATENT DOCUMENTS

| | | |
|---|---|---|
| AT | 514145 | 10/2014 |
| DE | 10361417 | 3/2005 |
| EP | 1393286 | 4/2007 |

*Primary Examiner* — Adam R Giesy
(74) *Attorney, Agent, or Firm* — Matthew M. Googe; Robinson IP Law, PLLC

(57) ABSTRACT

A system for translational navigation of an immersive virtual reality environment is provided. The system includes a head mounted display having a field of view of the immersive virtual reality environment displayed on a display of the head mounted display and at least one sensor for detecting an orientation of the head mounted display. The system includes a user input control for translating input from a user into a velocity of the user in a single direction within the immersive virtual reality environment. A control module is provided in communication with the user input control and head mounted display for limiting movement of a user through the virtual reality environment to a direction corresponding to a center of the field of view when a velocity input is detected from the user input control.

14 Claims, 4 Drawing Sheets

(56) References Cited

U.S. PATENT DOCUMENTS

| | | | |
|---|---|---|---|
| 6,922,184 | B2 | 7/2005 | Lawrence et al. |
| 6,972,734 | B1 | 12/2005 | Ohshima et al. |
| 7,387,592 | B2 | 6/2008 | Couvillion, Jr. et al. |
| 7,454,309 | B2 | 11/2008 | Lawrence et al. |
| 7,780,573 | B1 | 8/2010 | Carmein |
| RE42,336 | E | 5/2011 | Fateh et al. |
| 8,681,074 | B2 | 3/2014 | Riechel |
| 9,063,633 | B2 | 6/2015 | Rajasingham |
| 2006/0183601 | A1* | 8/2006 | Couvillion, Jr. .. A61M 16/0465 482/1 |
| 2007/0042868 | A1 | 2/2007 | Fisher et al. |
| 2010/0035726 | A1 | 2/2010 | Fisher et al. |
| 2015/0212647 | A1* | 7/2015 | Kim .................... G02B 27/017 345/173 |

* cited by examiner

METHOD FOR ONE-TOUCH TRANSLATIONAL NAVIGATION OF IMMERSIVE, VIRTUAL REALITY ENVIRONMENTS

FIELD

This disclosure relates to the field of virtual reality navigation. More particularly, this disclosure relates to a system and method for navigating an immersive virtual reality environment that minimizes the effects of motion sickness on a user.

BACKGROUND

Head mounted displays ("HMDs") enable a user to interactively immerse oneself in a virtual reality environment to experience that environment remotely. HMDs allow a user to experience the environment by allowing the user to turn the user's head wherein a corresponding point of view displayed to the user on the HMD changes based on the direction of the user's head. Early versions of HMDs suffered from high latency between the time that head movement is detected and when the point of view is changed, due to hardware limitations. The result of this high latency was induced nausea in the user, likely caused by a conflict in the user's vestibular senses in relation to movement displayed to the user's eyes. The clinical name for this form of nausea is Video Game Motion Sickness (VGMS), and is commonplace when first person point of view action video games are played near a large screen display. VGMS is further magnified by use of an immersive display such as HMDs, particularly if the motion and verstibular feedback experienced by a user are not synchronized.

Recent hardware advances have significantly reduced latency between user head movement input detected by an HMD and changes in the field of view displayed to the user on the HMD. This has significantly reduced the inducement of nausea in a user when the user is at a stationary location in the virtual reality environment and simply viewing surroundings of the user in the virtual reality environment such as an interior of buildings or vehicles.

While advances in hardware have reduced the inducement of nausea in a user when the user is stationary relative to a surrounding virtual reality environment, attempts to navigate the user through the virtual reality environment have been found to rapidly induce nausea in the user by creating a conflict between a user's vestibular sense and virtual reality image viewed by the user. This is particularly true in "near field" virtual reality environments, wherein a user is in close proximity to objects within the virtual reality environment.

Various forms of input controls exist that allow a user to navigate a virtual environment that attempt to reduce any motion sickness related to virtual reality navigation. For example, U.S. Pat. No. 6,135,928 provides a large sphere for a user to walk on, wherein movement of the sphere is translated into motion through a virtual reality environment. Similarly, U.S. Pat. No. 7,780,573 describes a treadmill type apparatus for translating movement of a user in a virtual reality environment in multiple planes, and U.S. Pat. No. 5,902,214 describes a set of mechanical stirrups for detecting user movement and translating the detected movement into movement in a virtual reality environment. While these devices attempt to solve issues related to movement through a virtual reality environment, these and other similar devices are substantially complicated and large because they are configured to detect a user's body motion and translate that motion into movement in the virtual reality environment.

In other instances, users are allowed to freely navigate a virtual reality environment using one or more joysticks or similar controllers, wherein there is no connection between directional movement and a user's view on the virtual reality headset. This type of navigation frequently induces nausea in the user due to perceived motion conflict between the user's optical and vestibular systems.

Other attempts have been made to allow a user to interact with a virtual reality environment. For example, U.S. Pat. Nos. 6,127,990 and 6,359,603 describe a system for allowing a user to view a portion of a large display by moving the user's head. However, these systems do not provide for navigation of a user through a virtual reality environment, but instead are limited to viewing a display.

What is needed, therefore, is a system and method for navigating an immersive virtual reality environment that minimizes effects of motion sickness on a user by restricting movement of the user based on an orientation of a head mounted display worn by the user.

SUMMARY

The above and other needs are met by a system and method for navigating an immersive virtual reality environment that minimizes effects of motion sickness on a user. In a first aspect, the system includes a head mounted display having a field of view of the immersive virtual reality environment displayed on a display of the head mounted display and at least one sensor for detecting an orientation of the head mounted display. The system includes a user input control for translating input from a user into a velocity of the user in a single direction within the immersive virtual reality environment. A control module is provided in communication with the user input control and head mounted display for limiting movement of a user through the virtual reality environment to a direction corresponding to a center of the field of view when a velocity input is detected from the user input control.

In one embodiment, the user input control comprises a joystick for translating input from a user into a single direction velocity of the user in the immersive virtual reality environment, the direction corresponding to a detected orientation of the head mounted display. In another embodiment, the single axis velocity is detected as an ON/OFF condition depending on whether the joystick is actuated by the user.

In yet another embodiment, the user input control comprises a touch pad, and wherein user input control is detected as an ON/OFF condition depending on whether the touch pad is contacted by the user. In one embodiment, the user input control is attached to an outside of the head mounted display.

In another embodiment, the user input control comprises a voice activated control wherein verbal commands received on the voice activated control are translated into a velocity of the user through the virtual reality environment.

In yet another embodiment, the immersive virtual reality environment displayed on the head mounted display corresponds to a computer aided design drawing. In one embodiment, the computer aided design drawing is of an architectural structure.

In one embodiment, a direction of movement of the user through the virtual reality environment is limited to two-dimensional movement based on a yaw angle of the head mounted display. In another embodiment, a direction of movement of the user through the virtual reality environment is determined based on a yaw angle and pitch of the head mounted display for allowing the user to navigate a volumetric space.

In a second aspect, a method of translational navigation of a virtual reality environment is provided including the steps of: providing a virtual reality vehicle moveable within a virtual reality environment; displaying a field of view from within the virtual reality vehicle on the head mounted display, the field of view corresponding to an orientation of the head mounted display; displaying near-field objects within the field of view, the near field objects corresponding to portions of the virtual reality vehicle surrounding the field of view of the user; displaying a view of an external environment of the virtual reality environment from within the virtual reality vehicle; receiving user input from a user input control device; synchronizing the near-field objects with the field of view such that the near-field objects are synchronized to a user's field of view when user input is detected from the user input device; translating the received user input from the user input control device into a velocity of the virtual reality vehicle through the virtual reality environment in a direction corresponding to an orientation of the user's head and attached head mounted display; and updating the view of the external environment of the virtual reality environment based on movement of the virtual reality vehicle through the virtual reality environment.

In one embodiment, movement of the user is restricted to a direction corresponding to a yaw angle of the head mounted display such that the user may only move in a two-dimensional direction at a fixed elevation in the virtual reality environment. In another embodiment, movement of the user is restricted to a direction based on a yaw angle and pitch of the head mounted display such that the user may navigate a volumetric environment.

In a third aspect, a method of translational navigation of an immersive virtual reality environment including the steps of: displaying a field of view of an immersive virtual reality environment on a head mounted display, the field of view corresponding to an orientation of the head mounted display; receiving user input from a user input control device; translating the received user input from the user input control device into a single-axis velocity of the user through the immersive virtual reality environment; and restricting movement of the user and an orientation of the field of view in the immersive virtual reality environment such that when a user input is received, movement of the user is only along an axis aligned with a center of the field of view of the immersive virtual reality environment.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A system and method of navigating an immersive virtual reality environment is provided that allows a user to readily navigate a virtual reality environment. The system and method of the present disclosure reduces nausea induced in a user during navigation of a virtual reality environment by limiting movement along a single vector when a user input is detected. By limiting movement along a single vector aligned with an orientation of the user's head when a user input is detected, a user's optical and vestibular systems are not conflicted by any differential rotational or lateral movement during translation through the virtual reality environment, thereby reducing potential nausea caused by conflicts between the vestibular and optical systems of the user.

Figure 1:
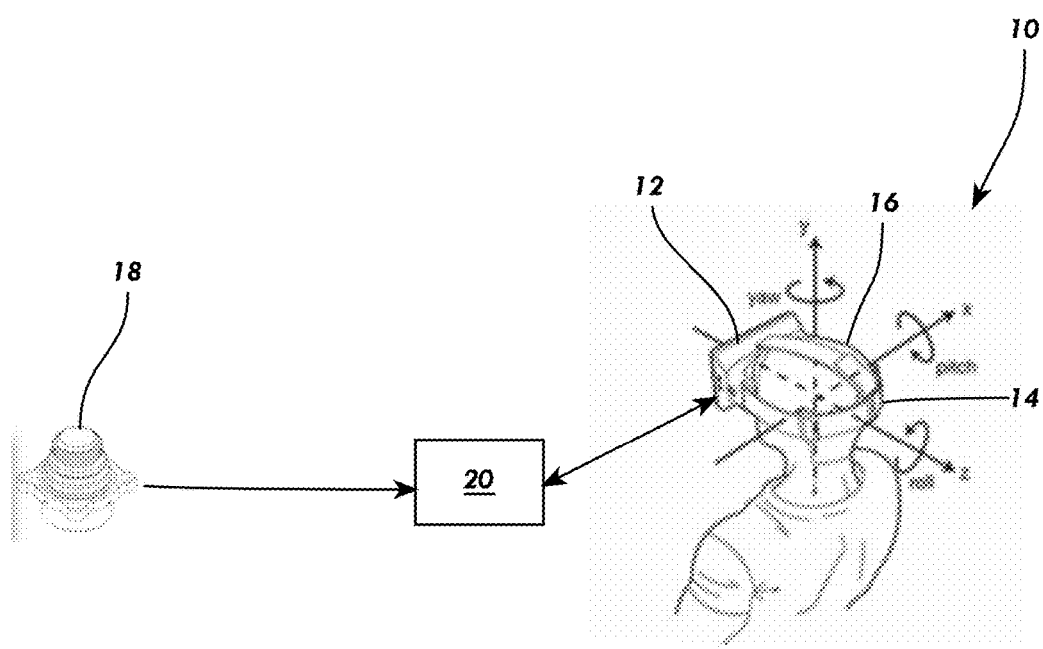
FIG. 1 illustrates a system for navigating an immersive virtual reality environment according to one embodiment of the present disclosure.

FIG. 1 illustrates a system for navigating an immersive virtual reality environment 10, the system including a head mounted display 12 and one or more straps 14 securing the head mounted display 12 to a head 16 of a user. The head mounted display 12 includes a display, such as a stereographic display, positioned adjacent eyes of the user. The head mounted display further includes one or more sensors for detecting an orientation of the head mounted display. The one or more sensors of the head mounted display detect an orientation of the head mounted display with respect to a yaw angle of the head mounted display (around a y-axis), a pitch angle of the head mounted display (around an x-axis), and a roll angle of the head mounted display (around a z-axis). The one or more sensors may include a gyroscope, accelerometer, magnetometer, or optical sensors for detecting an orientation of the head mounted display 12. Commercially available head mounted displays include, for example, head mounted displays such as the Samsung Gear VR® and head mounted displays from Occulus Rift®.

A field of view of a virtual reality environment is displayed to a user on the head mounted display 12 such that the user is immersed within the virtual reality environment. When a user changes an orientation of the user's head, the sensors of the head mounted display 12 detect changes to the yaw angle, pitch angle, and roll angle of the head mounted display. Based on these detected changes, the field of view of the virtual reality environment displayed to the user changes to correspond with an orientation of the user's head and attached head mounted display 12. For example, when the user looks left, the field of view changes to display a field of view to the left of the user in the virtual reality environment.

The system for navigating a virtual reality environment 10 includes a user input control 18. The user input control 18 is configured to receive input from a user and translate the user input into a velocity of the user in the virtual reality environment. The user input control 18 may be formed of one or more of a joystick, touchpad, button, trigger, foot pedal, or other like control device that is capable of detecting input from a user. In one embodiment, the user input control 18 may be a voice activated control, wherein an input velocity is determined by verbal commands such as "go" or "go slow", and a velocity is terminated when a verbal command such as "stop" is issued. The user input control 18 may be configured to detect a variable quantity of user input such that the greater an input detected by the user input control 18 the faster a velocity of the user in the virtual reality environment. When the user input control 18 is a joystick, a velocity of the user in the virtual reality environment may increase based on a distance of the joystick from a center position, thereby allowing the user to control the user's speed. Similarly, when the user input control is a touch pad, a user may vary a velocity of the user through he virtual reality environment based on a distance between where a user contacts the touch pad and a center of the touch pad. In one embodiment, the user input control is limited to detecting an ON/OFF condition, indicating whether the user is contacting or actuating the user input control.

The user input control 18 and head mounted display 12 may be in communication with a control module 20. The control module 20 may include one or more processors or other computing devices, a computer readable storage medium, and one or more input and output components. The control module 20 may be an external component, such as a personal computer, smartphone, or tablet. Alternatively, the control module 20 may be integrated into the head mounted display such that no external devices are required. The control module 20 receives input from the user input control 18 and translates the received input into a velocity component in accordance with the description below. Executable code or programming are operable on the control module 20 to translate input from the user input control 18 into movement through a virtual reality environment.

The user input control 18 may either be a separate component in wired or wireless electronic communication with components of the head mounted display 12 or, alternatively, may be integrated with the head mounted display 12. For example, the user input control 18 may be a joystick on a remote control, wherein the joystick is in communication with the head mounted display 12 directly or through a computer, smartphone, or tablet. In an integrated form, the user input control 18 may be formed or attached to the head mounted display 12, such as a touch pad or button mounted on a side of the head mounted display 12.

Figure 2:
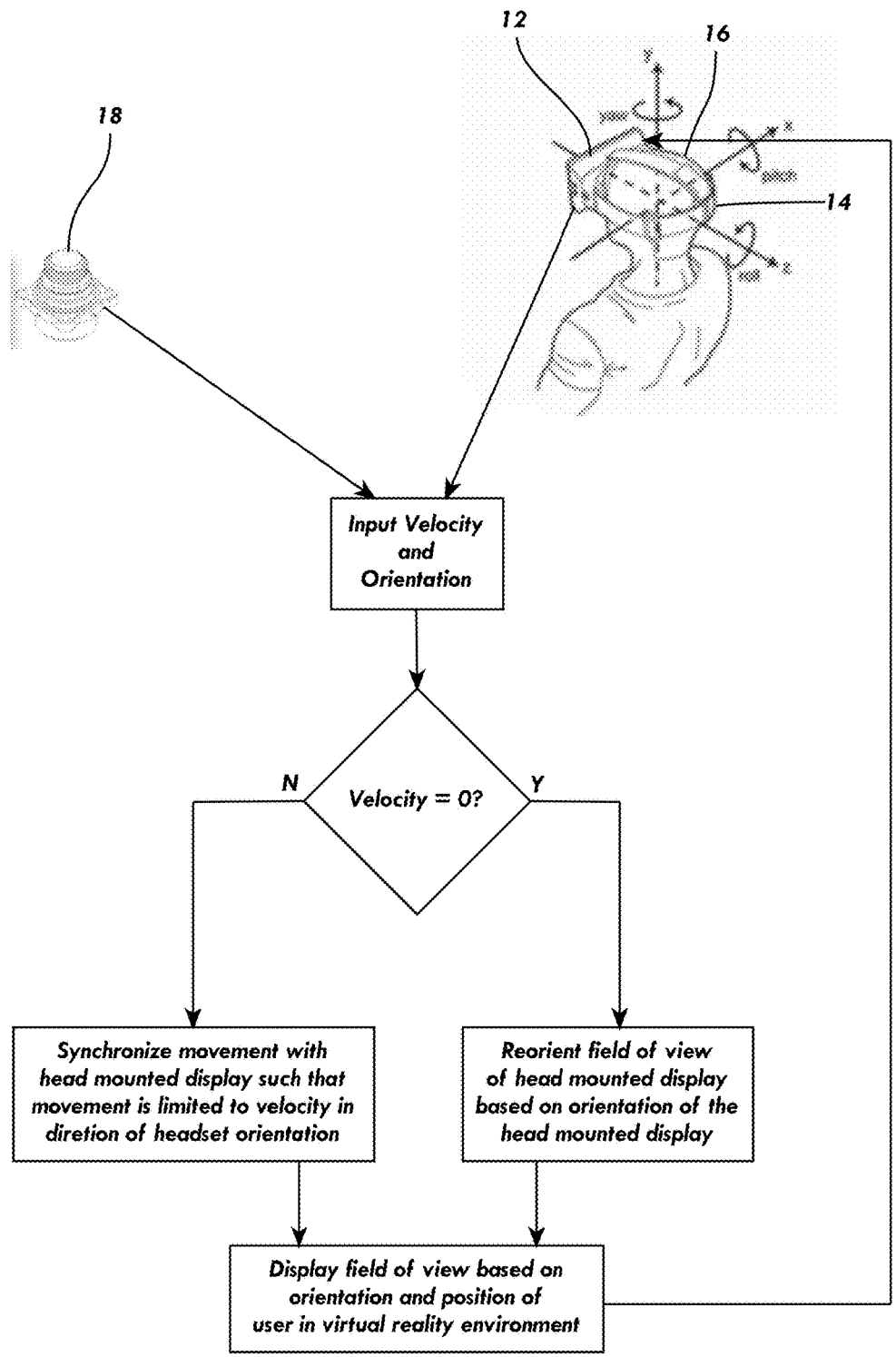
FIG. 2 illustrates a system and method for navigating an immersive virtual reality environment according to one embodiment of the present disclosure.

Referring now to FIG. 2, the system for navigating an immersive virtual reality environment 10 aligns translation of a user through a virtual reality environment with a field of view of the user when user input is detected from the user input control 18 such that movement of the user through the virtual reality environment is limited along a single axis that is aligned with the field of view displayed to the user on the head mounted display 12. When no user input is detected from the user input control 18 and the user is therefore stationary within the virtual reality environment, the field of view of the virtual reality environment displayed to the user on the head mounted display 12 changes freely based on an orientation of the head mounted display 12 and user's head 16. When the user looks up, down, left, or right, the field of view displayed to the user on the head mounted display 12 changes accordingly.

When a user input is detected from the user input control 18, the user input is translated into a single direction velocity of the user through the virtual reality environment. Upon detecting a velocity of the user from a user input, the orientation of the virtual reality headset and velocity are synchronized such that the user moves through the virtual environment only in the direction of a center of the field of view of the virtual reality headset. As long as a velocity input is detected, the user's direction of travel through the virtual reality environment is confined to a direction corresponding to an orientation of the head mounted display. If continuous user input is detected, movement will continue in the direction of an orientation of the head mounted display. If the head mounted display 12 is re-oriented by the user while user input is detected, the user will move at the detected velocity in a direction of a field of view of the re-oriented head mounted display. When a user input is no longer detected from the user input control 18, a velocity of the user through the virtual reality environment is set to zero such that the user is stationary in the virtual reality environment. When no velocity is detected, the user is free to re-orient a field of view of the head mounted display without moving through the virtual reality environment. After a user re-orients the head mounted display, a field of view is displayed to the user corresponding to the re-oriented head mounted display. If a velocity was detected and the user moved through the virtual reality environment, the field of view displayed to the user on the head mounted display corresponds to a new orientation and position of the user in the virtual reality environment.

Figure 3:
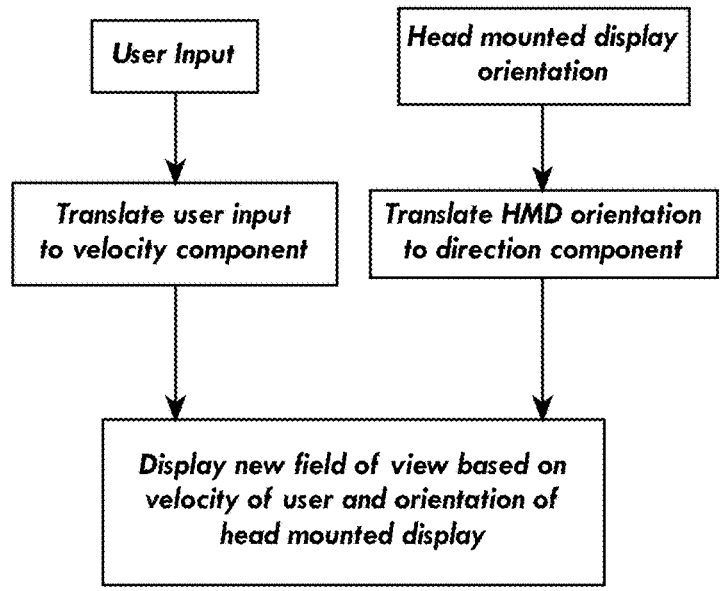
FIG. 3 illustrates synchronization of input velocity from a user with an orientation of the head mounted display according to one embodiment of the present disclosure.

FIG. 3 illustrates a flow chart corresponding to a method of synchronizing an orientation of the head mounted display 12 with a user input corresponding to a velocity of a user in a virtual reality environment. When a user input is detected on the user input control 18, the user input is translated into a velocity component for movement of the user in a virtual reality environment. An orientation of the head mounted display 12 is detected and translated into a direction component, the direction being a center of the field of view of the virtual reality environment on the head mounted display 12. The translated velocity and direction corresponding to an orientation of the head mounted display 12 are combined into a velocity vector defining movement of the user through the virtual reality environment. The vector combines an orientation of the head mounted display with a velocity translated from the user input and limits movement of the user to the translated velocity in the direction of a center of the field of view of the head mounted display 12.

Figure 4:
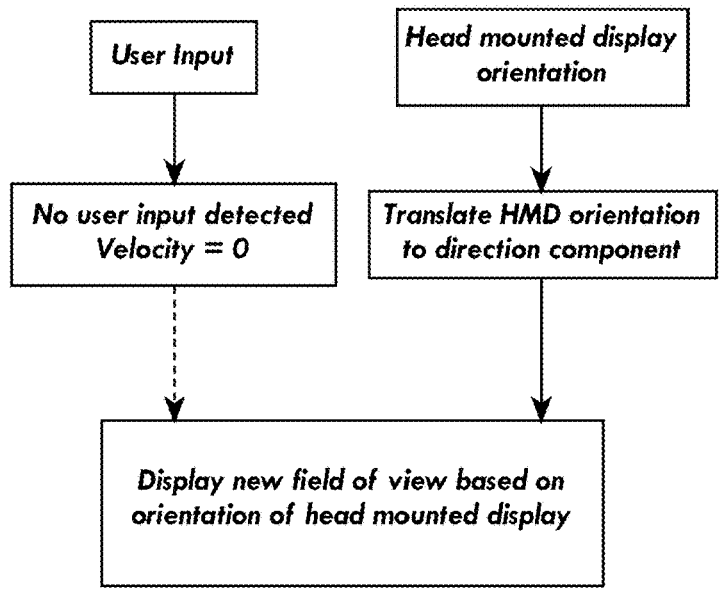
FIG. 4 illustrates re-orientation of a user's field of view in a virtual reality environment when no user input is detected according to one embodiment of the present disclosure.

FIG. 4 illustrates a flow chart corresponding to a method of displaying a field of view to a user on the head mounted display 12 when no user velocity input is detected. When no user input is detected, a user is free to re-orient a field of view on the head mounted display by turning the user's head. When user movement is detected, the head mounted display 12 detects an orientation of the head mounted display 12 and user's head and displays a field of view corresponding to an orientation of the head mounted display 12 in the virtual reality environment.

Movement of the user in the virtual reality environment may either be confined to a single, horizontal plane or, alternatively, be allowed in both a horizontal plane and a vertical plane. When confined to a horizontal plane, the user may move along the horizontal plane in only a horizontal direction corresponding to a center of the field of view of the head mounted display 12 for two-dimensional navigation. When navigating along a single horizontal plane, the user may be free to re-orient a field of view of the head mounted display 12 in a vertical direction by adjusting a pitch angle of the head mounted display 12. However, a direction of travel of the user through the virtual reality environment will only change based on changes in a yaw angle of the head mounted display 12. For spatial navigation of a three-dimensional environment in both a horizontal and vertical plane, movement of the user through the virtual reality environment is allowed where the user moves toward a center of the field of view of the head mounted display 12 according to both a yaw angle and pitch angle of the head mounted display.

In operation, a virtual reality environment is displayed on the head mounted display 12, and the head mounted display 12 is worn on the user's head 16. The virtual reality environment displayed on the head mounted display 12 may be stored on a storage device, wherein the storage device may either be an external computer, smartphone or table, or a storage device integrated with the head mounted display 12. Suitable virtual reality environments may be selected from video games, three-dimensional models, computer aided drawings, or other suitable media. In one embodiment, the virtual reality environment is a three-dimensional representation of a structure, such as a structure drawn by an architect. In other embodiments, the virtual reality environment may be a video game or simulation of a real-world environment. Further, while the present disclosure refers to navigating a virtual reality environment, it is also understood that the system of the present disclosure may be adaptable for use with augmented reality environment that includes both real world and virtual world displays to the user.

The virtual reality environment is preferably a near-field environment relative to a view of the user on the head mounted display 12. As referred to herein, a near-field environment may be one in which the field of view displayed to the user on the head mounted display 12 creates the perception of a user being with close proximity to objects in the virtual reality environment, such as within 100 feet of an object in the virtual reality environment. An example of a near-field virtual reality environments may include an environment wherein a user walks through a structure, such as a house. Similarly, a near-field virtual reality environment may exist where a user is in close proximity to a model of a component or object, or in a video game wherein the user interacts with objects within a close proximity to the user.

Various types of virtual reality environments may be displayed to the user on the head mounted display, such as three-dimensional renderings of CAD drawings or other plan illustrations. After displaying the virtual reality environment on the head mounted display 12, the user may navigate the virtual reality environment by interacting with the user input control 18.

When the user desires to navigate within the virtual reality environment, the user engages the user input control 18, such as by pressing a button or moving a joystick of the user input control 18. Upon detecting user input from the user input control 18, an orientation of the head mounted display 12 and velocity of the user inputted on the user input control 18 are synchronized or locked together such that the user's movement is restricted and the user will only move in a direction towards a center of the field of view of the virtual reality environment displayed on the head mounted display 12. Any change in an orientation of the head mounted display 12 that occurs while the user is contacting the user input control 18 results in continued movement in a new direction that corresponds to a center of the field of view of the virtual reality environment displayed on the re-oriented head mounted display 12.

When the user releases the user input control 18 and no additional user input is detected, the velocity of the user in the virtual reality environment is zero, or rapidly declines or coasts to zero depending on dynamics of the virtual reality environment, and the user becomes stationary in the virtual reality environment. When no user input is detected, a field of view of the user is unlocked such that the user is free to change a field of view of the virtual reality environment displayed on the head mounted display 12 by reorienting the user's head and attached head mounted display 12.

While the above description contemplates the user input controlling a velocity of a user through a user through a virtual reality environment, it is also understood that detected user input may be translated into a thrust of a user through the virtual reality environment. When detected user input is translated into thrust, the user may accelerate in a direction restricted to a center of a field of view displayed to the user on the head mounted display 12. When the user releases the input control 18 such that no user input is detected, the user may continue to travel in a direction corresponding to a center of the last field of view displayed to the user while user input was detected until a friction component of the virtual reality environment stops the user. When the user continues to move after releasing the user input, the user may then be free to reorient a field of view displayed on the head mounted display 12 without affecting the direction in which the user continues to drift until friction stops the user's movement in the virtual reality environment.

In one embodiment, the system for navigating an immersive virtual reality environment of the present disclosure is configured to navigate a virtual reality vehicle within the virtual reality environment, wherein a user's point of view is from within the vehicle during navigation. The user's point of view within the vehicle includes both near-field objects such as controls and surrounding features of the vehicle (i.e. a dash, steering wheel, windows, roof, and sides) and an environment exterior to the vehicle viewable to the user from within the virtual reality vehicle. The field of view displayed to the user on the head mounted display 12 is a field of view simulating a view of the user in a non-virtual environment, such as from a driver's seat of a vehicle.

Figure 5:
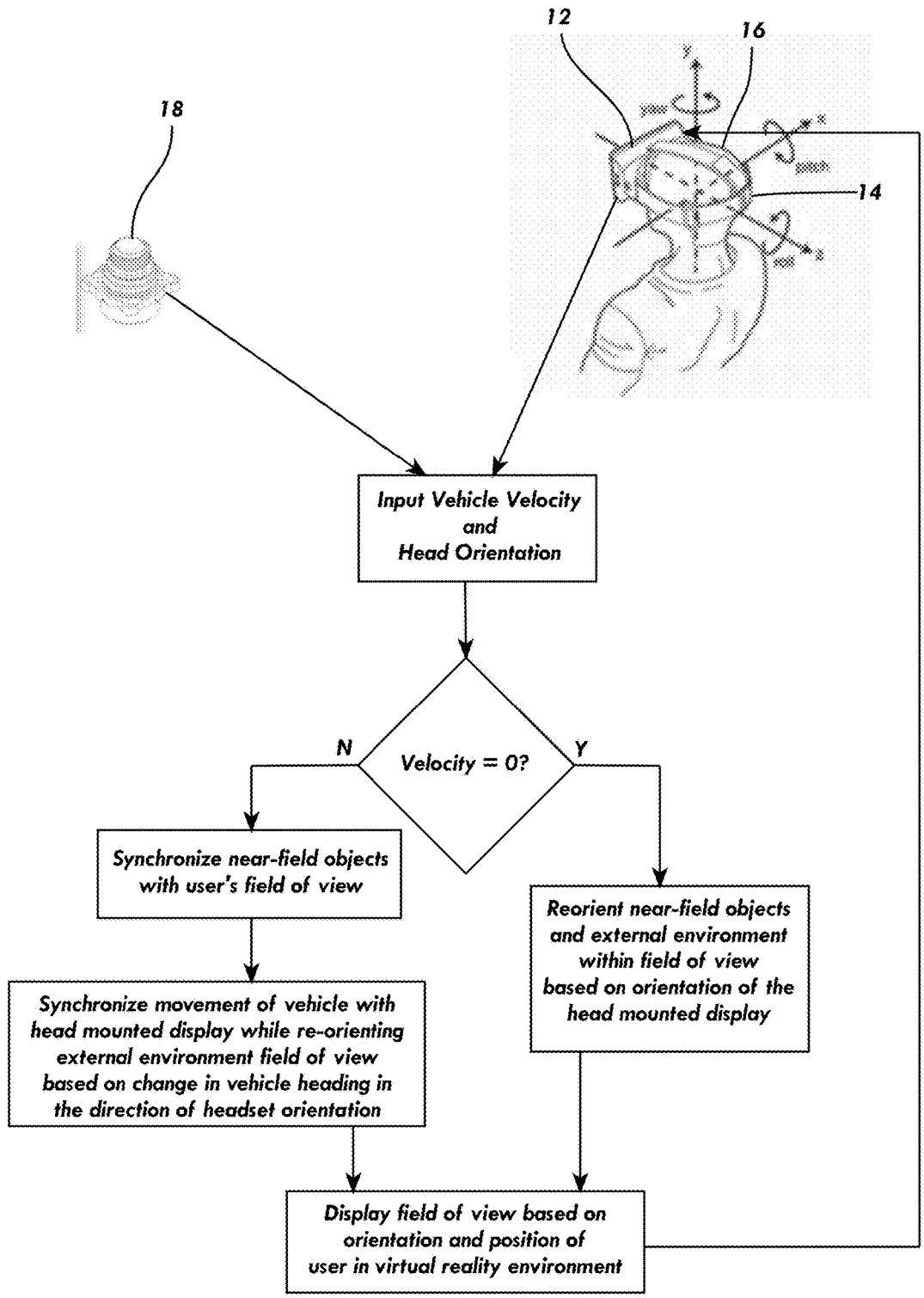
FIG. 5 illustrates a system for navigating a vehicle within a virtual reality environment according to one embodiment of the present disclosure.

Referring to FIG. 5, when no user input is detected from the user input control 18, the user is free to re-orient a field of view displayed to the user on the head mounted display by changing an orientation of the user's head and attached head mounted display 12. When the user adjusts an orientation of the head mounted display 12 and changes the field of view displayed to the user, the field of view changes in relation to both the near field objects within the virtual reality vehicle and the environment external to the vehicle. For example, if a user turns the user's head to the left from a center-facing view, the near-field objects are adjusted in the user's field of view such that the user may look out of a left-hand direction of the vehicle.

A user may navigate the virtual reality vehicle within the virtual reality environment by causing an input on the user input control 18. When user input is detected from the user input control 18, the near-field objects displayed to the user become synchronized or locked to the user's field of view. The virtual reality vehicle will move at a velocity corresponding to input detected from the user input control 18 in a direction corresponding to an orientation of the user's head and attached head mounted display 12. The direction of movement is limited to a center of the field of view displayed to the user when user input is detected on the user input control 18. The user's head orientation and view of near-field objects within the vehicle are locked such that when a user turns the user's head an orientation of the near-field objects within the vehicle does not change.

Changes in an orientation of the user's head and attached head mounted display 12 are detected by sensors of the head mounted display 12 and translated into changes in a direction of travel of the virtual reality vehicle in the virtual reality environment. A yaw angle of the user's head is detected using sensors of the head mounted display 12 and translated into a direction of travel of the virtual reality vehicle. The changes in direction of travel may be translated into steering input for the virtual reality vehicle such that the vehicle steers left or right depending on an orientation of the user's head. Further, changes in pitch angle of the user's head are detected by the head mounted display and translated into changes in climb or descent of the virtual reality vehicle in the virtual reality environment. When user input is detected, the virtual reality vehicle will move in a direction corresponding to a center of the field of view of a user's head orientation. As the vehicle changes directions, the near-field objects remain fixed to the user's field of view, while a view of the environment external to the virtual reality vehicle changes based on a speed and direction of travel of the virtual reality vehicle. When the user releases the user input control 18 such that no user input is detected, the user's field of view is substantially released or unlocked from the near-field objects viewable to the user such that the user may re-orient the user's field of view within the virtual reality vehicle. In one embodiment, the virtual reality vehicle may continue to coast until a friction element of the virtual reality environment causes the vehicle to stop. During coasting, the user may be free to re-orient the user's field of view within the virtual reality vehicle.

As an illustrative example of navigating a virtual reality vehicle in a virtual reality environment using the above-described method of navigation, the virtual reality vehicle may comprise a computer-generated representation of a forklift in a virtual reality environment such as a warehouse. When no use input is detected, the user is free to look around from a driver's seat of the forklift without the virtual forklift moving in the surrounding environment. The user may turn the user's head to look out of a left-hand side, right-hand side, or other direction of the forklift. When the user desires to move and user input is detected, the user's near-field view of the surrounding forklift is synchronized with an orientation of the user's head. The virtual forklift vehicle begins to move towards a center of field of view displayed to the user on the head mounted display 12, which corresponds to an orientation of the user's head and attached head mounted display 12. While the user's head orientation and near-field view are synchronized, the user's view of the external environment changes based on movement of the forklift through the virtual reality environment.

It has been found that by synchronizing a velocity of a user with a center of a field of view of the virtual reality environment displayed on the head mounted display such that movement is restricted or locked to that direction, nausea of the user is substantially reduced due to reduced conflict between the user's vestibular system and optical system. In a traditional controller wherein a user may operate a joystick that allows unrestricted movement of the user in both a forward and backward and side-to-side movement while allowing the user to also re-orient a field of view of the virtual reality environment by moving the user's head, nausea is rapidly induced because the user may be moving in various directions that are unaligned with a view presented to the user and that are not detected by the user's vestibular system. The system and method of the present disclosure are particularly advantageous in navigating near-field virtual reality environments, and for applications such as immersive viewing of a three-dimensional architectural plan, computer aided design component, or other application in which a user may closely inspect an object in the virtual reality environment. Navigating the virtual reality environment using the present system and method has been found to greatly reduce instances of nausea in the user or at least greatly prolonged the amount of time the user may spend engaged with the virtual reality environment before experiencing nausea or other motion related issues.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A system for translational navigation of an immersive virtual reality environment comprising:
   a head mounted display including
      a display showing a field of view of the immersive virtual reality environment, the field of view corresponding to an orientation of the head mounted display relative to the immersive virtual reality environment, and
      at least one sensor for detecting the orientation of the head mounted display;
   a user input control for translating input from a user into movement of a user in a single direction within the immersive virtual reality environment; and
   a control module in communication with the user input control and the head mounted display, wherein movement of a user through the virtual reality environment is limited by the control module to a direction of a center of the field of view corresponding to the orientation of the head mounted display when a velocity input is detected from the user input control; and
   wherein movement of the user remains limited to the direction of the center of the field of view when the orientation of the head mounted display changes, the change in orientation corresponding to movement of the head mounted display.

2. The system of claim 1, wherein the user input control comprises a joystick for translating input from a user into a single direction velocity of the user in the immersive virtual reality environment, the single direction velocity corresponding to a detected orientation of the head mounted display.

3. The system of claim 2, wherein the single axis velocity is detected as an ON/OFF condition depending on whether the joystick is actuated by the user.

4. The system of claim 1, wherein the user input control comprises a touch pad, and wherein user input control is detected as an ON/OFF condition depending on whether the touch pad is contacted by the user.

5. The system of claim 1, wherein the user input control is attached to an outside of the head mounted display.

6. The system of claim 1, wherein the user input control comprises a voice activated control wherein verbal commands received on the voice activated control are translated into a velocity of the user through the virtual reality environment.

7. The system of claim 1, wherein the immersive virtual reality environment displayed on the head mounted display corresponds to a computer aided design drawing.

8. The system of claim 7, wherein the computer aided design drawing is of an architectural structure.

9. The system of claim 1, wherein a direction of movement of the user through the virtual reality environment is limited to two-dimensional movement based on a yaw angle of the head mounted display.

10. The system of claim 1, wherein a direction of movement of the user through the virtual reality environment is determined based on a yaw angle and pitch of the head mounted display for allowing the user to navigate a volumetric space.

11. A method of translational navigation of a virtual reality environment comprising:
   providing a virtual reality vehicle moveable within a virtual reality environment;
   displaying a field of view from within the virtual reality vehicle on the head mounted display, the field of view corresponding to an orientation of the head mounted display;
   displaying near-field objects within the field of view, the near field objects corresponding to portions of the virtual reality vehicle surrounding the field of view;
   displaying a view of an external environment of the virtual reality environment from within the virtual reality vehicle;
   receiving user input from a user input control device;
   synchronizing the near-field objects with the field of view such that the near-field objects are synchronized to a user's field of view when user input is detected from the user input device;
   translating the received user input from the user input control device into a velocity of the virtual reality vehicle through the virtual reality environment, wherein movement of the virtual reality vehicle is fixed in a direction corresponding to an orientation of the user's head and attached head mounted display; and
   updating the view of the external environment of the virtual reality environment based on movement of the virtual reality vehicle through the virtual reality environment;
   wherein movement of the user remains limited to the direction of the center of the field of view when the orientation of the head mounted display changes, the change in orientation corresponding to movement of the head mounted display.

12. A method of translational navigation of an immersive virtual reality environment comprising:
   displaying a field of view of an immersive virtual reality environment on a head mounted display, the field of view corresponding to an orientation of the head mounted display;
   receiving user input from a user input control device;
   translating the received user input from the user input control device into a single-axis velocity of the user through the immersive virtual reality environment; and
   restricting movement of the user and an orientation of the field of view in the immersive virtual reality environment such that when a user input is received, movement of the user is only along an axis aligned with a center of the field of view of the immersive virtual reality environment corresponding to an orientation the head mounted display;
   wherein movement of the user remains limited to the direction of the center of the field of view when the orientation of the head mounted display changes, the change in orientation corresponding to movement of the head mounted display.

13. The method of claim 12, further comprising restricting movement of the user to a direction corresponding to a yaw angle of the head mounted display such that the user may only move in a two-dimensional direction.

14. The method of claim 12, further comprising restricting movement of the user to a direction based on a yaw angle and pitch of the head mounted display such that the user may navigate a volumetric environment.

* * * * *